May 3, 1955          D. DREHER          2,707,365
GRAIN LIFTING ATTACHMENT FOR MOWING MACHINES
Filed June 5, 1953          2 Sheets-Sheet 1
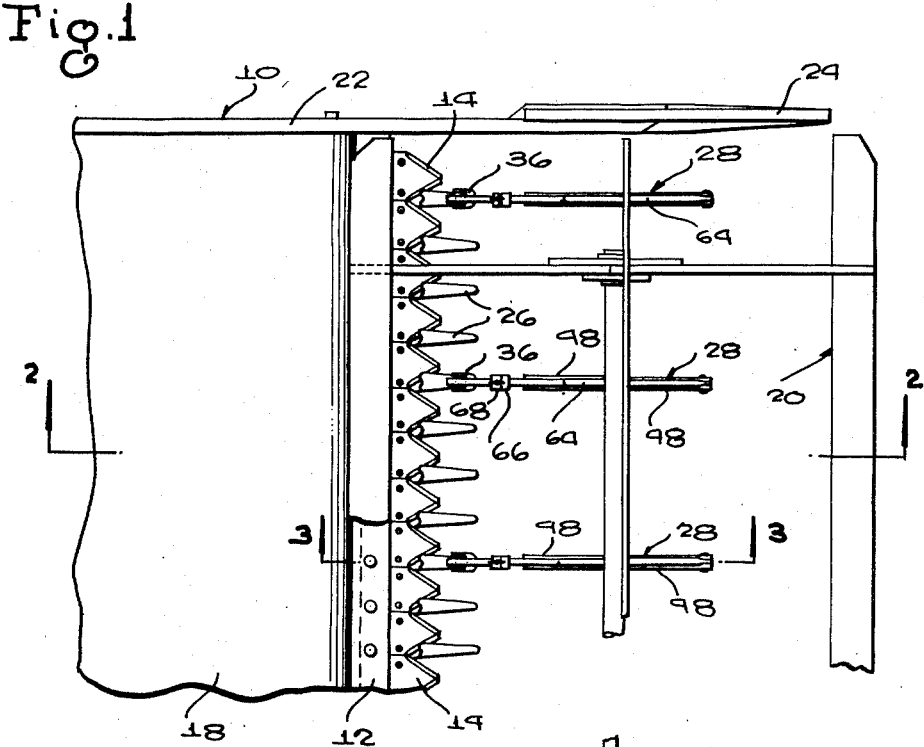
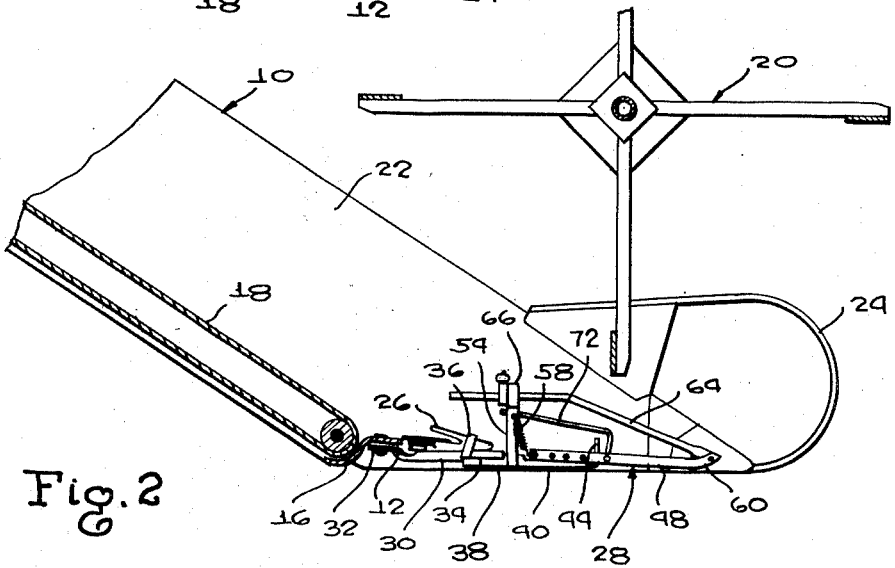
INVENTOR.
DANIEL DREHER
BY
McMorrow, Berman & Davidson
ATTORNEYS May 3, 1955
D. DREHER
2,707,365
GRAIN LIFTING ATTACHMENT FOR MOWING MACHINES
Filed June 5, 1953
2 Sheets-Sheet 2
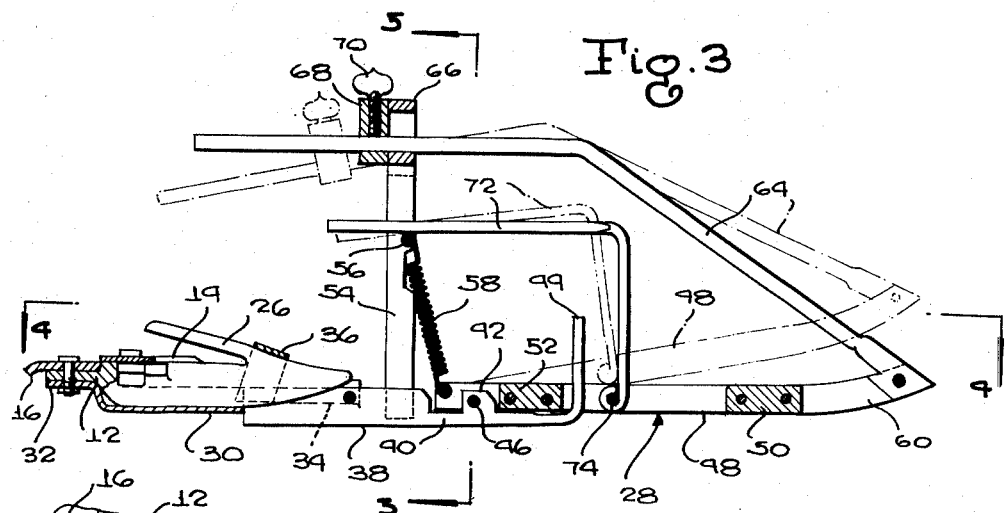
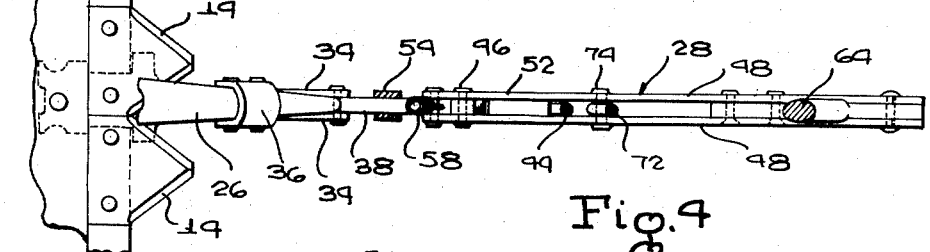
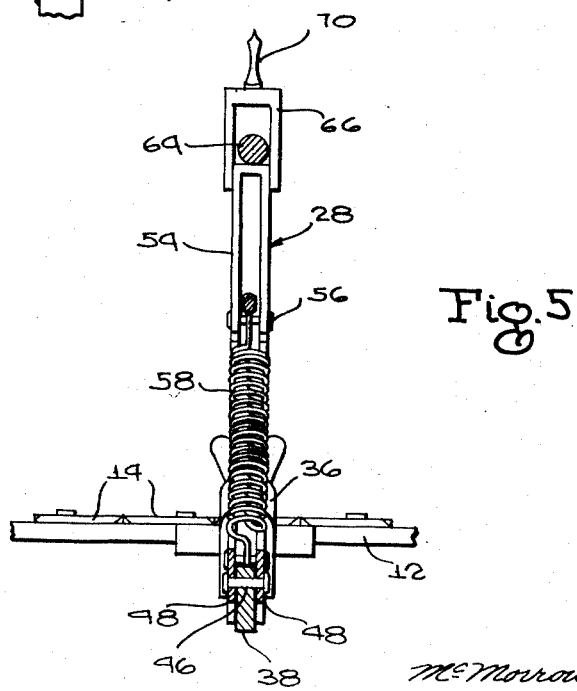
INVENTOR.
DANIEL DREHER
BY
McMorrow, Berman & Davidson
ATTORNEYS ated May 3, 1955

2,707,365

GRAIN LIFTING ATTACHMENT FOR MOWING MACHINES

Daniel Dreher, Salina, Kans., assignor of one-half to Sanford Manker and one-half to Eugene H. Linville, both of Salina, Kans.

Application June 5, 1953, Serial No. 359,707

3 Claims. (Cl. 56—312)

This invention relates to mowing machine attachments, and more particularly, has reference to a device attachable to the guard finger of a header, combine, binder, or the like, said device projecting forwardly from said guard finger and being so designed as to lift fallen grain to a position in which, when cut by the sickle bar of the machine, it will fall back onto the conveyor belt of the machine, for removal.

One important object is to provide a device of the type stated which can be attached to a conventional guard finger without requiring modification or redesign of said guard finger or of any other part of the machinery, it being proposed, in this regard, to so form the attachment as to permit it to be removed whenever desired, with substantial speed and ease.

Another object is to provide an attachment as described which, when secured to the guard finger, will be adjustable upwardly or downwardly to selected elevations relative to the ground surface, and will be yieldable upwardly in each position to which it is so adjusted. Thus, it is proposed that the attachment will be, in effect, self-adjusting to variations in the ground contour, in all positions to which it is shifted when fixing the same at a selected angle relative to the ground surface.

Another object of importance is to provide a device as stated which will have a guide means associated therewith, that will assure the making of proper adjustments as to the angle of the attachment relative to the ground surface, said guide means being further adapted to properly guide the grain lifting portion of the device during the upward yielding movement of said portion.

Other objects will appear from the following description, the claims appended thereto, and from the annexed drawings, in which like reference characters designate like parts throughout the several views, and wherein:

Figure 1 is a fragmentary top plan view of a mowing machine equipped with a grain lifting and positioning attachment formed in accordance with the present invention;

Figure 2 is a sectional view taken on line 2—2 of Figure 1, the attachment being shown in side elevation;

Figure 3 is an enlarged longitudinal sectional view through the attachment taken on line 3—3 of Figure 1, the dotted lines indicating one position to which the device can be adjusted as to elevation above the ground surface;

Figure 4 is a sectional view taken substantially on line 4—4 of Figure 3; and

Figure 5 is a transverse sectional view taken substantially on line 5—5 of Figure 3, on an enlarged scale.

Referring to the drawings in detail, the reference numeral 10 has been applied generally to a conventional mowing machine. At this point, it may be noted that the particular type of mowing machine on which the device is mounted is relatively immaterial, and it is proposed that the device can be used on any of various machines, such as headers, combines, binders, etc.

In any event, the illustrated mowing machine has a sickle bar 12, and fixedly secured to and projecting forwardly from said sickle bar is a series of teeth 14, the teeth 14 being disposed side by side throughout the length of the sickle bar.

A conveyor apron 16 is secured to the sickle bar 12, and projects rearwardly therefrom, said apron 16 being inclined downwardly to provide clearance for the front end of a conveyor belt 18. A reel has been designated generally by the reference numeral 20, and side walls 22 extend along the opposite sides of the conveyor belt 18, so as to protectively enclose the same. At their front ends, the walls 22 have guards 24.

Spaced transversely of the mowing machine, and secured fixedly to the sickle bar, are V-shaped guard fingers 26, said guard fingers alternating with the cutting teeth 14 as best shown in Figure 1.

All this is conventional construction in a mowing machine, and does not, in and of itself, constitute part of the present invention.

The invention has been designated generally by the reference numeral 28, and is attached to the mowing machine by means of a connecting member 30. As will be noticed, a plurality of the attachments is used on a mowing machine, said attachments being spaced transversely of the mowing machine (see Figure 1). Each attachment used is secured to a selected guard finger 26.

The connecting member 30, intermediate its ends, is of channeled formation, and receives the underside of the selected guard finger 26. At its rear end, the connecting member 30 is integrally formed with a substantially horizontally disposed tongue 32, said tongue being bolted or otherwise fixedly connected to the underside of the sickle bar 12.

At its front end, the connecting member 30 is integrally formed with transversely spaced, forwardly projecting longitudinal extensions 34. Spaced rearwardly from the front end of the connecting member is a stirrup 36 of inverted U shape, said stirrup being fixedly secured to the opposite side walls of the channeled portion of the connecting member, and straddling the selected guard finger 26.

It will be seen that in this way, the connecting member is attached directly to the sickle bar and guard finger, and will be immovably held in proper position by means of the connecting bolt and stirrup.

The attachment also includes a support means for a grain lifting and positioning member, said support means comprising, in part, a substantially horizontally disposed support bar 38. The support bar 38 is embraced by the extensions 34, and is riveted or otherwise fixedly secured, at its rear end, to said extensions. The support bar 38 projects forwardly from the extensions a substantial distance, as best shown in Figure 3, and adjacent its front end, is reduced in width as at 40. The front end portion of the support bar, though reduced in width for substantially its full length, has, intermediate its ends, an upwardly projecting ear 42.

At its front end, the support bar 38 is integrally formed with an upwardly and vertically extending projection 44.

A pivot pin 46 is carried by and is disposed transversely of the ear 42, and serves to pivotally connect a grain lifting and positioning member to the support bar. The grain lifting and positioning member includes, as a main part thereof, an elongated runner formed of a pair of identical, transversely spaced runner members 48. The reduced front end portion of support bar 38 is disposed between the runner members, and to retain the runner members in their properly spaced arrangement, spacer blocks 50, 52 are disposed therebetween. Rivets or equivalent fastening elements extend through the runner members and spacer blocks, thereby to cause the runner members to be fixedly joined in transversely spaced relation.

It will be seen from the above that the runner, composed of runner members 48, is mounted upon the support bar 38 for up and down swinging movement. In Figure 3 the runner is shown in its lowermost position, in full lines. In the same figure, the dotted lines show one position to which the runner is adjustable upwardly about its pivot axis 46.

A guide member 54 is fixedly connected, at its lower end, to the midlength portion of the support bar 38, and extends upwardly and vertically from said support bar. The guide member 54 is of inverted U shape, as best shown in Figure 5, and extending between the legs of the guide member, intermediate the opposite ends of said member, is a pin 56, about which is hooked the upper end of a spring 58.

The lower end of the spring 58 is hooked about a pin carried by and extending transversely between the rear ends of the runner members 48. Spring 58, tending to compress, pulls upwardly upon the rear end of the runner, and accordingly, normally tends to retain the runner in its lowermost position.

The front end of the runner is curved upwardly as at 60, and fixedly connected to said upwardly curved front end is the front end of a grain lifting rod 64. The rod 64 is of angular formation, and is disposed above the runner, said rod and runner diverging rearwardly from their point of fixed connection.

At the upper end of the guide member 54, a rod guide 66 is fixedly mounted, said rod guide 66 being of inverted U shape and cooperating with the adjacent portion of the guide member to define an opening in which the rear end portion of the grain lifting rod 64 is loosely disposed.

A block or collar 68 is mounted upon said rear end portion of rod 64, and is adjustable longitudinally of the rod. A set screw 70, threadable in the block 68, is engageable against the rod 64 in each position to which the block is adjusted longitudinally thereof.

It will be seen from the above that the grain lifting member defined by the runner and the rod 64 can be adjusted about its pivot axis 46, to selected angles relative to the ground surface. To effect such adjustments, it is merely necessary that the screw 70 be loosened, after which the block 68 is adjusted to a selected position longitudinally of rod 64. Thereafter, the screw 70 is tightened, and it will be seen that the block 68, engaging the upper end of the guide member 54, will hold the runner and the rod 64 against downward movement beyond a selected position of adjustment. At the same time, however, the runner and rod 64 are free to yield upwardly, the block 68 now moving away from the guide member 54.

This is of importance, since variations in ground contour are often encountered during mowing operations. Should the upwardly curved front end 60 of the runner encounter a hump, rock, or other obstruction, the runner will yield upwardly, and under the pull of the spring 58 will return to its normal position after the obstruction has been passed. This upward yielding action of the grain lifting means is obtained in each position to which said means is adjusted.

It is preferred that a means be incorporated in the grain lifting member to prevent grain or the like from lodging in spring 58, and to this end, an angular spring guard 72 is used, said angular spring guard having an eye at one end through which passes a pin 74. The pin 74 extends transversely between and is secured to the respective runner members 48. The horizontally disposed, rearwardly projecting other end of the spring guard rests upon the pin 56, and it will be understood that the eye of the guard 72 will be sufficiently loose on pin 74 to permit the guard 72 to rest on pin 56, regardless of the position to which the grain lift member is vertically adjusted.

In use of the device, the mowing machine, as it moves along the ground, will bring the several lifting attachments against fallen grain, and as a result, said attachments will lift the grain and properly position the same for cutting. The attachments, will at the same time, cause the fallen grain, after the same is cut, to drop onto the conveyor belt 18, rather than be lost or forced to the side of or below the sickle bar.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A grain lifting and positioning attachment for mowing machines, comprising: a generally horizontal support bar; a channeled connecting member connected to said support bar and adapted to receive the underside of a mowing machine guard finger, said connecting member being adapted for fixed connection to a sickle bar on which said guard finger is mounted; a stirrup carried by said connecting member and adapted to extend over the guard finger to secure the connecting member in position against the guard finger; a lifting member including a runner pivotally connected intermediate its ends to and projecting forwardly from said support bar, said runner having an upwardly curved front end and said lifting member further including a grain lifting rod secured to the front end of the runner, the runner and grain lifting rod diverging rearwardly from their point of fixed connection with the rod being disposed above the runner; an upstanding guide member on the support bar, said rod being loosely mounted in said guide member; and a stop block mounted on and adjustable longitudinally of said rod, said block being engageable against the guide member to hold the rod in selected positions to which it is adjusted with the runner, the rod and runner being free to yield upwardly in each position to which they are adjusted.

2. A grain lifting and positioning attachment for the sickle bar of a mowing machine, comprising: a generally horizontal support bar; a connecting member having an intermediate portion of channeled, upwardly opening formation adapted to receive the underside of a guard finger of a mowing machine, said connecting member being integrally formed at one end with a horizontally disposed, flat tongue adapted to lie flat against and be bolted to the underside of a mowing machine sickle bar on which said guard finger is mounted, said connecting member being formed integrally at its other end with transversely spaced, forwardly projecting longitudinal extensions embracing one end of said support bar between them and fixedly secured to the support bar; a stirrup of inverted U-shape spaced longitudinally of the connecting member from said other end thereof and fixedly secured to the opposite side walls of the channeled intermediate portion of the connecting member, said stirrup being adapted to straddle said guard finger; and a grain lifting and positioning member mounted upon the other end of said support bar, said member comprising a runner projecting forwardly from and connected to the last-named end of the support bar in substantial longitudinal alignment with the support bar, said member further including a grain lifting rod having a leading end connected to the forward end of said runner, said runner and lifting rod diverging rearwardly from the connected ends thereof with the trailing end of the lifting member being spaced vertically above the connecting member support bar and runner in vertical alignment therewith.

3. A grain lifting and positioning attachment for mowing machines, comprising: a generally horizontal support bar; a channeled connecting member connected to said support bar and adapted to receive the underside of a mowing machine guard finger, said connecting member being adapted for fixed connection to a sickle bar on which said guard finger is mounted; a stirrup carried by said connecting member and adapted to extend over the guard finger to secure the connecting member in position against the guard finger; a lifting member including a runner pivotally connected intermediate its ends to and projecting forwardly from said support bar, said runner having an upwardly curved front end and said lifting member further including a grain lifting rod secured to the front end of the runners, the runner and grain lifting rod diverging rearwardly from their point of fixed connection with the rod being disposed above the runner; a vertically and upwardly extending guide member fixedly secured at its lower end to the support bar, said guide member being formed at its upper end with a vertically elongated guide opening, said rod having a trailing end portion loosely positioned through the guide opening and shiftable vertically within said guide opening responsive to movement of the runner about the pivot axis thereof, said rod having its trailing end portion projecting rearwardly from the guide member; a collar receiving said projecting portion of the rod and proportioned to engage against the upper end of the guide member on pivotal movement of the runner in one direction; spring means connected between the runner and guide member tensioned to normally urge the runner in said direction; and set screw means carried by said collar and threadable within the collar against the rod in selected positions to which the collar is adjusted longitudinally of the rod to fix the collar on the rod and limit swinging movement of the runner and rod in said direction, said rod and runner being free to yield upwardly to swing the runner in an opposite direction against the opposing action of the spring means, in each position to which the rod and runner are adjustably limited against movement in the first-named direction.

References Cited in the file of this patent
UNITED STATES PATENTS

| | | |
|---|---|---|
| 2,576,122 | Kenison | Nov. 27, 1951 |
| 2,577,324 | Goesch | Dec. 4, 1951 |

FOREIGN PATENTS

| | | |
|---|---|---|
| 451,123 | France | Feb. 5, 1913 |